(12) United States Patent
Raghunathan et al.

(10) Patent No.: US 12,547,802 B2
(45) Date of Patent: Feb. 10, 2026

(54) RECOMMENDING CHANGES IN THE DESIGN OF AN INTEGRATED CIRCUIT USING A RULES-BASED ANALYSIS OF FAILURES

(71) Applicant: International Business Machines Corporation, Armonk, NY (US)

(72) Inventors: SheshaShayee K Raghunathan, Bangalore (IN); Charles Gates, Poughkeepsie, NY (US); Kerim Kalafala, Rhinebeck, NY (US); Steven Joseph Kurtz, Austin, TX (US); Morgan D. Davis, Rochester, MN (US); Debra Dean, Cary, NC (US); Chris Cavitt, Queensbury, NY (US); Chaitra M Bhat, Bangalore (IN); Richard William Taggart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 17/963,920

(22) Filed: Oct. 11, 2022

(65) Prior Publication Data

US 2024/0119205 A1    Apr. 11, 2024

(51) Int. Cl.
*G06F 30/398* (2020.01)
*G06F 30/31* (2020.01)
(Continued)

(52) U.S. Cl.
CPC ............ *G06F 30/31* (2020.01); *G06F 30/398* (2020.01); *G06F 2119/10* (2020.01); *G06F 2119/12* (2020.01)

(58) Field of Classification Search
CPC .......... G06F 30/30; G06F 30/31; G06F 30/32; G06F 30/398; G06F 2119/10; G06F 2119/12; G06F 30/367; G06F 30/373
(Continued)

(56) References Cited

U.S. PATENT DOCUMENTS 10,108,475 B2   10/2018   Chikabelapur et al.
10,705,903 B2   7/2020    Majumder et al.
(Continued)

FOREIGN PATENT DOCUMENTS

DE   112023004233 T5   8/2025
GB   2638096 A         8/2025
WO   2024/078160 A1    4/2024

OTHER PUBLICATIONS

International Search Report and Written Opinion for International Application No. PCT/CN2023/115285 dated Nov. 9, 2023, pp. 1-7.
(Continued)

*Primary Examiner* — Paul Dinh
(74) *Attorney, Agent, or Firm* — Shackelford, McKinley & Norton, LLP; Robert A. Voigt, Jr.

(57) ABSTRACT

A computer-implemented method, system and computer program product for recommending design changes in designing a digital integrated circuit. An analysis of the digital integrated circuit being designed is performed, where the result of such an analysis involves violations being identified and stored. A stored violation, such as a cross-domain, cross-hierarchy and multi-cycle violation, may then be analyzed to identify a root cause of the violation using a rule. Such a rule may be used for triaging various failures in the cross-domain, cross-hierarchy and/or multi-cycle violation of the digital integrated circuit. A design change in the design of the digital integrated circuit may then be recommended based on the identified root cause of the violation. In this manner, the root cause of failures are effectively (Continued)

identified in the design of digital integrated circuits using an offline analysis of cross-domain, cross-hierarchy and/or multi-cycle violations using a rules-based approach.

20 Claims, 7 Drawing Sheets

(51) Int. Cl.
  *G06F 119/10* (2020.01)
  *G06F 119/12* (2020.01)
(58) Field of Classification Search
  USPC .......................................................... 716/112
  See application file for complete search history.

(56) References Cited

U.S. PATENT DOCUMENTS

| | | | |
|---|---|---|---|
| 10,891,412 | B1 | 1/2021 | Raghunathan et al. |
| 10,970,200 | B2 | 4/2021 | Haubold et al. |
| 11,061,800 | B2 | 7/2021 | Prakash et al. |
| 11,205,092 | B2 | 12/2021 | Hickerson et al. |
| 11,252,052 | B1 | 2/2022 | Babu Balasubramani et al. |
| 11,314,582 | B2 | 4/2022 | Chaiken et al. |
| 2005/0268258 | A1* | 12/2005 | Decker ................ G06F 30/33 716/112 |
| 2006/0277512 | A1* | 12/2006 | Kucukcakar ......... G06F 30/39 716/112 |
| 2006/0282808 | A1* | 12/2006 | Byrn .................... G06F 30/30 716/102 |
| 2013/0159948 | A1 | 6/2013 | Agarwal et al. |
| 2014/0258954 | A1 | 9/2014 | De et al. |
| 2015/0052505 | A1 | 2/2015 | Mulat |
| 2020/0110647 | A1 | 4/2020 | Souche et al. |
| 2021/0216692 | A1 | 7/2021 | Whitty et al. |
| 2022/0100868 | A1 | 3/2022 | Tarrant et al. |

OTHER PUBLICATIONS

Hashemi et al., "Metrics 2.0: A Machine-Learning Based Optimization System for IC Design," Workshop on Open-Source EDA Technology, 2018, pp. 1-4.

Koopmans et al., "Automated Network Triage," Digital Investigation, vol. 10, No. 2, Sep. 2013, pp. 129-137.

Zhang et al., "BuildSheriff: Change-Aware Test Failure Triage for Continuous Integration Builds," IEEE/ACM 44th International Conference on Software Engineering (ICSE), May 21-29, 2022, pp. 1-13.

Roussev et al., "Real-Time Digital Forensics and Triage," Digital Investigation, vol. 10, No. 2, Sep. 2013, pp. 158-167.

Lohfink et al., "Security in Process: Visually Supported Triage Analysis in Industrial Process Data," arXiv:1912.04865V2, Jul. 23, 2021, pp. 1-10.

Anonymously, "System and Method for Automated Timing and Noise Closure in the Design of Digital Integrated Circuits (2)," ip.com, ip.com No. IPCOM000259321D, Jul. 30, 2019, pp. 1-4.

Zissis Poulos, "Failure Triage in RTL Regression Verification," IEEE Transactions on Computer-Aided Design, vol. 37, No. 9, Sep. 2018, pp. 1893-1906.

Kalafala et al., "Exchanging EDA data for AI/ML using Standard API," Design Automation Conference, Dec. 7, 2021, see Abstract.

Anshul et al., "Root-Cause Analysis of Undefined Slack Using Timing/Netlist Data Model," Design Automation Conference, Dec. 8, 2021, see Abstract.

Schmitter et al., "Timing Analytics and Reporting: From Design Start to Finish," Design Automation Conference, Jul. 11, 2022, see Abstract.

* cited by examiner

```
500 ↘

If (coupling_noise > high_noise_threshold && timing_slack < low_timing_slack_threshold) {
501⌇    triage_label = "high_coupling_poor_timing"                                        502
    }else if (coupling_noise > high_noise_threshold && timing_slack > high_timing_slack_threshold){
501⌇    triage_label = "high_coupling_good_timing"                                        502
    }else if (coupling_noise > high_noise_threshold){
501⌇    triage_label = "high_coupling"
    }else {
        triage_label = "NA"
    }
```

FIG. 5

RECOMMENDING CHANGES IN THE DESIGN OF AN INTEGRATED CIRCUIT USING A RULES-BASED ANALYSIS OF FAILURES

TECHNICAL FIELD

The present disclosure relates generally to integrated circuit design, and more particularly to recommending changes in the design of an integrated circuit using a rules-based analysis of failures (e.g., timing, noise, power, voltage).

BACKGROUND

Integrated circuit design, or IC design, is a sub-field of electronics engineering, encompassing the particular logic and circuit design techniques required to design integrated circuits, or ICs. ICs consist of miniaturized electronic components built into an electrical network on a monolithic semiconductor substrate by photolithography.

IC design can be divided into the broad categories of digital and analog IC design. Digital IC design is to produce components, such as microprocessors, FPGAs, memories (RAM, ROM, and flash) and digital ASICs. Digital IC design focuses on logical correctness, maximizing circuit density, and placement of circuits so that clock and timing signals are routed efficiently. In comparison to digital IC design, analog IC design focuses on power IC design and RF (radio frequency) IC design. Furthermore, analog IC design is used in the design of op-amps, linear regulators, phase locked loops, oscillators and active filters. Additionally, analog IC design is more concerned with the physics of the semiconductor devices, such as gain, matching, power dissipation, and resistance.

Modern ICs are enormously complicated. An average desktop computer chip has over 1 billion transistors. The rules for what can and cannot be manufactured are also extremely complex. Common IC processes have more than 500 rules. Furthermore, since the manufacturing process itself is not completely predictable, designers must account for its statistical nature. The complexity of modern IC design, as well as the market pressure to produce designs rapidly, has led to the extensive use of automated design tools, such as electronic design automation (EDA) tools, in the IC design process. For example, the EDA software tool may be used to design, test and verify the instructions that the IC is to carry out.

In the design of digital integrated circuits, such a design is tested and analyzed using various EDA tools to identify various violations, such as timing or noise failures. A "timing failure" is a failure of a process or part of a process in a synchronous distributed system or real-time system to meet limits set on execution, message delivery, clock drift rate or clock skew. A "noise failure" refers to unexpected variations in voltage due to a variety of factors, such as signal transitions on neighboring wires, that can potentially cause disruptions or damage in electrical circuits.

When such simulated failures occur (e.g., timing and noise failures), the designer attempts to identify the root cause of such failures. However, such an analysis (referred to as "triaging") is time consuming and difficult.

Furthermore, such failures (e.g., timing and noise failures) could be correlated. However, such correlations are difficult to assess thereby making it difficult to identify the root cause of such failures.

Additionally, such failures (e.g., timing and noise failures) may involve integration-level issues between components located at different hierarchies of the integrated circuit. For example, a multiple-cycle path may extend over many components located at different hierarchies of the integrated circuit. An analysis of such issues may involve analyzing each of the multiple hierarchical components individually, which is extremely difficult, thereby making it difficult to identify the root cause of such failures.

Consequently, there is not currently a means for effectively identifying the root cause of failures, such as timing and noise failures, in the design of digital integrated circuits.

SUMMARY

In one embodiment of the present disclosure, a computer-implemented method for recommending design changes in designing a digital integrated circuit comprises performing an analysis of the digital integrated circuit resulting in a plurality of violations. The method further comprises analyzing one of the plurality of violations to identify a root cause of the one of the plurality of violations involving a cross-domain, a cross-hierarchy and/or a multi-cycle violation using a rule. The method additionally comprises recommending a design change in designing the digital integrated circuit for the one of the plurality of violations based on the identified root cause.

In this manner, root causes of failures, such as timing and noise failures, in the design of digital integrated circuits will be effectively identified using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach.

In another embodiment of the present disclosure, a computer program product for recommending design changes in designing a digital integrated circuit, where the computer program product comprises one or more computer readable storage mediums having program code embodied therewith, where the program code comprising programming instructions for performing an analysis of the digital integrated circuit resulting in a plurality of violations. The program code further comprises the programming instructions for analyzing one of the plurality of violations to identify a root cause of the one of the plurality of violations involving a cross-domain, a cross-hierarchy and/or a multi-cycle violation using a rule. The program code additionally comprises the programming instructions for recommending a design change in designing the digital integrated circuit for the one of the plurality of violations based on the identified root cause.

In this manner, root causes of failures, such as timing and noise failures, in the design of digital integrated circuits will be effectively identified using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach.

In a further embodiment of the present disclosure, a system comprises a memory for storing a computer program for recommending design changes in designing a digital integrated circuit and a processor connected to the memory. The processor is configured to execute program instructions of the computer program comprising performing an analysis of the digital integrated circuit resulting in a plurality of violations. The processor is further configured to execute the program instructions of the computer program comprising analyzing one of the plurality of violations to identify a root cause of the one of the plurality of violations involving a cross-domain, a cross-hierarchy and/or a multi-cycle violation using a rule. The processor is additionally configured to execute the program instructions of the computer program comprising recommending a design change in designing the digital integrated circuit for the one of the plurality of violations based on the identified root cause.

In this manner, root causes of failures, such as timing and noise failures, in the design of digital integrated circuits will be effectively identified using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 illustrates the pseudo code for an exemplary rule for identifying a root cause of a cross-domain, cross-hierarchy and multi-cycle violation of the digital integrated circuit in accordance with an embodiment of the present disclosure;

DETAILED DESCRIPTION

Figure 1:
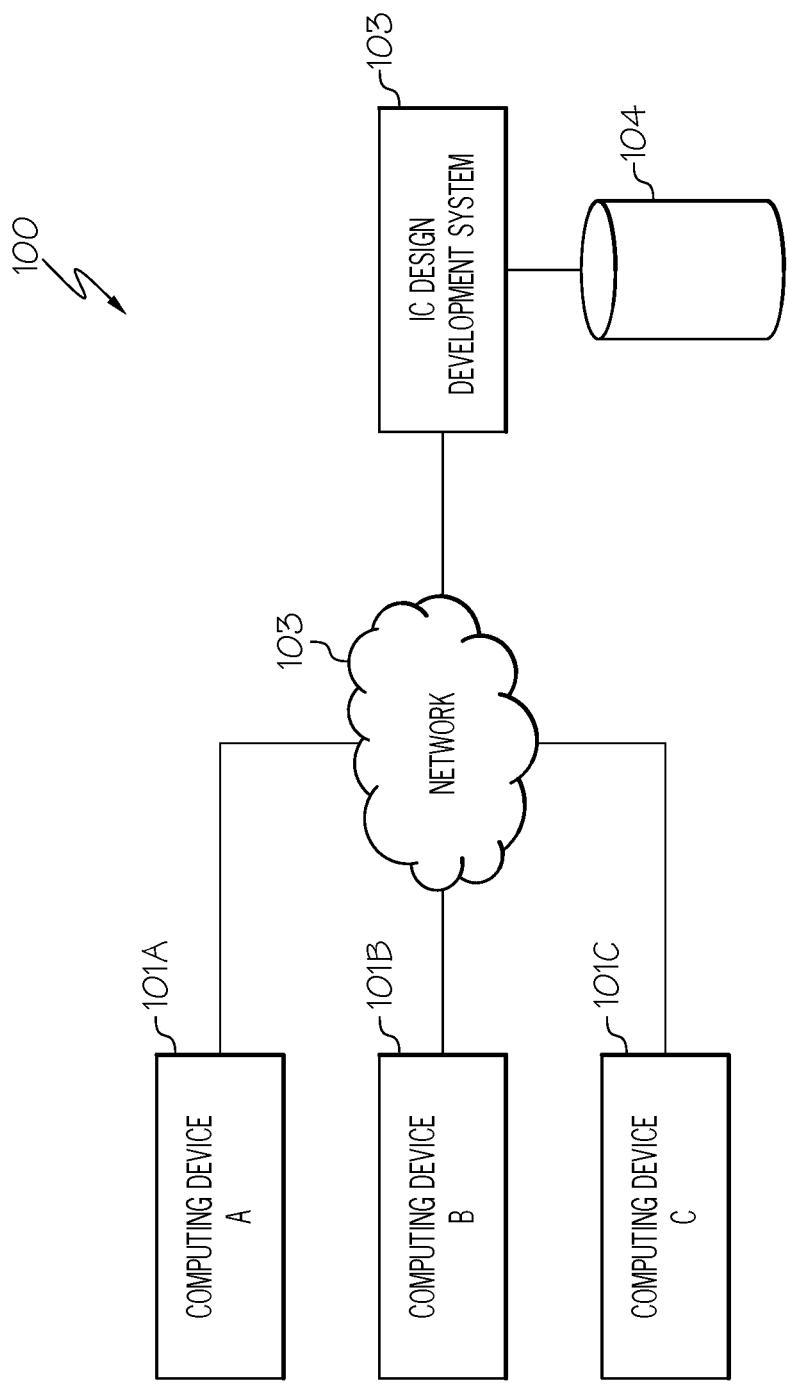
FIG. 1 illustrates a communication system for practicing the principles of the present disclosure in accordance with an embodiment of the present disclosure.

As stated in the Background section, in the design of digital integrated circuits, such a design is tested and analyzed using various EDA tools to identify various violations, such as timing or noise failures. A "timing failure" is a failure of a process or part of a process in a synchronous distributed system or real-time system to meet limits set on execution, message delivery, clock drift rate or clock skew. A "noise failure" refers to unexpected variations in voltage due to a variety of factors, such as signal transitions on neighboring wires, that can potentially cause disruptions or damage in electrical circuits.

When such simulated failures occur (e.g., timing and noise failures), the designer attempts to identify the root cause of such failures. However, such an analysis (referred to as "triaging") is time consuming and difficult.

Furthermore, such failures (e.g., timing and noise failures) could be correlated. However, such correlations are difficult to assess thereby making it difficult to identify the root cause of such failures.

Additionally, such failures (e.g., timing and noise failures) may involve integration-level issues between components located at different hierarchies of the integrated circuit. For example, a multiple-cycle path may extend over many components located at different hierarchies of the integrated circuit. An analysis of such issues may involve analyzing each of the multiple hierarchical components individually, which is extremely difficult, thereby making it difficult to identify the root cause of such failures.

Consequently, there is not currently a means for effectively identifying the root cause of failures, such as timing and noise failures, in the design of digital integrated circuits.

The embodiments of the present disclosure provide a means for effectively identifying the root cause of failures in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach as discussed in further detail below.

In some embodiments of the present disclosure, the present disclosure comprises a computer-implemented method, system and computer program product for recommending design changes in designing a digital integrated circuit. In one embodiment of the present disclosure, an analysis of the digital integrated circuit being designed is performed, where the result of such an analysis involves violations being identified and stored. A "violation," as used herein, refers to the performance of a component or system in the design of the digital integrated circuit not meeting a required specification, such as provided by the designer, resulting in a fault (e.g., noise failure, timing failure, power failure, etc.). In one embodiment, such an analysis may involve verification and simulation of the design of the digital integrated circuit based on various characteristics or parameters, such as voltage transfer characteristics, noise margins, fanout, power dissipation, propagation delay times and the interrelationships among these parameters. In one embodiment, such an analysis ensures that it conforms to the functional or parametric specifications, which may be provided by the designer. A stored violation may then be analyzed to identify a root cause of the violation, including a cross-domain, cross-hierarchy and/or multi-cycle violation, using a rule. "Cross-domain," as used herein, involves multiple types of failures, such as timing failures and noise failures. "Cross-hierarchy," as used herein, involves multiple levels of the integrated circuit design. "Multi-cycle," as used herein, involves a multiple-cycle path extended over many components. In one embodiment, such violations are analyzed using the rules offline. In one embodiment, such rules are parameterized. In one embodiment, the cross-domain, cross-hierarchy and/or multi-cycle violation, such as involving timing and noise failures, is identified using an offline analysis of the violation of the digital integrated circuit using a rules-based approach. Such a rules-based approach includes rules that are targeted for triaging various failures of the cross-domain, cross-hierarchy and/or multi-cycle violation that were identified based on analyzing the design of the digital integrated circuit using an electronic design automation tool (e.g., Eagle®, KiCAD®, Pulsonix, Multisim®, Altium Designer®, etc.). "Triaging," as used herein, refers to analyzing the failures, such as to determine the root cause of such failures. In one embodiment, such rules address cross-domain, cross-hierarchy and/or multi-cycle violations, such as by using parameterized thresholds involving multiple domains. Furthermore, such rules may address a violation that involves a path that traverses a hierarchy in the design of the digital integrated circuit. The "hierarchy," as used herein, refers to the levels of the digital integrated circuit, where each level includes one or more components of the digital integrated circuit. Additionally, such rules may address a violation involving a multiple-cycle path extended over many components. A design change in the design of the digital integrated circuit may then be recommended based on the identified root cause of the violation, such as a cross-domain violation. In one embodiment, such a recommendation is based on utilizing a data structure (e.g., table) that includes a listing of design recommendations based on the identified root causes. In one embodiment, such recommendations may be generated using a model (mathematical model) that has been trained using a machine learning algorithm for providing a recommendation based on the identified root cause of the violation, such as a cross-domain violation. In one embodiment, the recommended design change is implemented in the design of the digital integrated circuit. In this manner, the root cause of failures, such as timing and noise failures, are effectively identified in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to an IC (integrated circuit) design development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and IC design development system 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

IC design development system 102 identifies the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach as discussed in further detail below.

In one embodiment, IC design development system 102 is a system utilized, such as by designers (e.g., users of computing devices 101), in the process of designing digital integrated circuits (e.g., microprocessors, memories, digital ASICs (application-specific integrated circuits), FPGAs (field programmable gate arrays), etc.). In one embodiment, during the process of designing integrated circuits (ICs), IC design development system 102 is configured to analyze the design for violations. A "violation," as used herein, refers to the performance of a component or system in the design of the digital integrated circuit not meeting a required specification, such as provided by the designer, resulting in a fault (e.g., noise failure, timing failure, power failure, etc.). In one embodiment, such violations include "cross-domain," "cross-hierarchy," and/or "multi-cycle" violations. "Cross-domain," as used herein, involves multiple types of failures, such as timing failures and noise failures. "Cross-hierarchy," as used herein, involves multiple levels of the integrated circuit design. "Multi-cycle," as used herein, involves a multiple-cycle path extended over many components. In one embodiment, such violations are stored in a database, such as database 104 connected to IC design development system 102. A further discussion regarding analyzing the design of the digital integrated circuit for violations is provided below.

As discussed above, in one embodiment, IC design development system 102 is configured to identify the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach. Such a rules-based approach includes rules, which may be provided by an expert, that are targeted for triaging various failures of cross-domain, cross-hierarchy and/or multi-cycle violations that were identified based on analyzing the design of the digital integrated circuit using an electronic design automation tool (e.g., Eagle®, KiCAD®, Pulsonix, Multisim®, Altium Designer®, etc.). "Triaging," as used herein, refers to analyzing the failures, such as to determine the root cause of such failures. In one embodiment, such rules address cross-domain, cross-hierarchy and/or multi-cycle violations, such as by using parameterized thresholds involving multiple domains. For example, such rules may address a cross-domain, cross-hierarchy and multi-cycle violation using parameterized thresholds involving both noise and timing data. For instance, one of the rules could be a noise and timing rule for the noise impact on function (NIOF) violation. Such a rule may be utilized to analyze the relatedness of noise and timing data, where nets (wires that connect components) failing in the noise impact on function violation with high levels of aggressor coupling (noise coupled in from other sources) obtained from noise data are classified differently based on timing slack (margin by which a timing requirement is met or not met) obtained from timing data using user-defined thresholds. Such a cross-domain, cross-hierarchy and multi-cycle triage is important because the root cause will be more effectively identified, which in turn, will provide a better recommendation for addressing such a root cause. For instance, the design approach to address a noise failure may change based on the timing slack (timing data).

Additionally, in one embodiment, IC design development system 102 recommends a design change in designing the digital integrated circuit based on the identified root cause of a failure. For example, in one embodiment, IC design development system 102 utilizes a data structure (e.g., table) that includes a listing of design recommendations based on identified root causes. For example, IC design development system 102 may recommend replacing the NAND logic gate (small NAND logic gate) identified by number 100122 in the design with the NAND logic gate (large NAND logic gate) identified by number 102233 receiving digital signals identified by numbers 122233, 132343, and 122343 when the rule indicates that the root cause of the NIOF violation was a coupling failure at the NAND logic gate identified by number 100122 in the design. In one embodiment, such a data structure is populated by an expert. In one embodiment, such a data structures resides within a storage device (e.g., memory, disk drive) of IC design development system 102.

In one embodiment, such recommendations may be generated using a model (mathematical model) that has been trained using a machine learning algorithm for providing a recommendation based on the identified root cause of the violation as discussed in further detail below.

Figure 2:
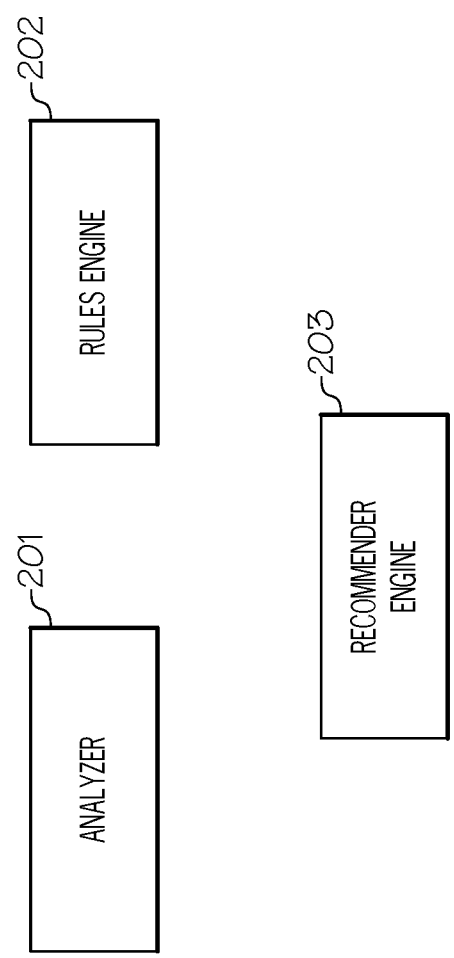
FIG. 2 is a diagram of the software components used by the integrated circuit (IC) design development system to identify the root cause of failures in the design of digital integrated circuits using an offline analysis of cross-domain, cross-hierarchy and/or multi-cycle violations of the digital integrated circuit using a rules-based approach in accordance with an embodiment of the present disclosure.

A description of the software components of IC design development system 102 used for identifying the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach is provided below in connection with FIG. 2. A description of the hardware configuration of IC design development system 102 is provided further below in connection with FIG. 6.

System 100 is not to be limited in scope to any one particular network architecture. System 100 may include any number of computing devices 101, IC design development systems 102, networks 103 and databases 104.

A discussion regarding the software components used by IC design development system 102 to identify the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach is provided below in connection with FIG. 2.

FIG. 2 is a diagram of the software components used by IC design development system 102 (FIG. 1) to identify the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach in accordance with an embodiment of the present disclosure.

Referring to FIG. 2, in conjunction with FIG. 1, IC design development system 102 includes an analyzer 201 configured to perform an analysis of the design of the digital integrated circuit. Such an analysis may involve verification and simulation of the design of the digital integrated circuit based on various characteristics or parameters, such as voltage transfer characteristics, noise margins, fanout, power dissipation, propagation delay times and the interrelationships among these parameters.

In one embodiment, analyzer 201 analyzes the design of the digital integrated circuit to ensure that it conforms to the functional or parametric specifications, which may be provided by the designer (e.g., user of computing device 101). For example, analyzer 201 may analyze the design of the digital integrated circuit to determine if every logic gate is functioning according to its truth table specification. In another example, analyzer 201 determines if the electrical paths in the design are identical to those in the device.

Furthermore, in one embodiment, analyzer 201 performs parametric tests on the design of the digital integrated circuit based on the analysis of a continuous circuit parameter. For example, analyzer 201 may determine if the steady-state current requirements of the device are excessive. In another example, analyzer 201 determines if the effects of process variations are within tolerance. In a further example, analyzer 201 determines if the performance requirements (e.g., delay fault) are met.

Additionally, in one embodiment, parametric tests may include analyzing continuous circuit variables, such as noise margins, propagation delay, maximum clock frequencies, steady-state current, transient signal behavior, etc. In one embodiment, such parameters are checked under a number of different temperature and supply voltages.

In one embodiment, analyzer 201 utilizes various software tools (e.g., electronic design automation (EDA) tools) for performing such analysis of the design of the digital integrated circuit, including, but not limited to, Cadence®, Synopsys®, Mentor Graphics®, Atrenta, etc.

As a result of performing such analysis on the design of a digital integrated circuit, violations may be detected. A "violation," as used herein, refers to the performance of a component or system in the design of the digital integrated circuit not meeting a required specification, such as provided by the designer, resulting in a fault (e.g., noise failure, timing failure, power failure, etc.). In one embodiment, such violations include "cross-domain," "cross-hierarchy" and/or "multi-cycle" violations.

"Cross-domain," as used herein, involves multiple types of failures, such as timing failures and noise failures. A "timing failure," as used herein, refers to a failure of a process or part of a process in a synchronous distributed system or real-time system to meet limits set on execution, message delivery, clock drift rate or clock skew. A "noise failure," as used herein, refers to unexpected variations in voltage due to a variety of factors, such as signal transitions on neighboring wires, that can potentially cause disruptions or damage in electrical circuits. "Cross-hierarchy," as used herein, involves multiple levels of the integrated circuit design. "Multi-cycle," as used herein, involves a multiple-cycle path extended over many components.

In one embodiment, such violations are identified as a result of the analysis performed by the software tools (e.g., EDA tools) discussed above. For example, EDA tools may identify faults at the logic level corresponding to timing failures, noise failures, power failures, etc.

In one embodiment, such violations are stored, such as in database 104. In one embodiment, such stored violations also include metadata, which includes parameters that were utilized by analyzer 201 to determine that a violation had occurred. Furthermore, such metadata includes the relevant data (e.g., noise margins, propagation delay, maximum clock frequencies, steady-state current, transient signal behavior) that was utilized by analyzer 201 to render the decision of a violation.

In one embodiment, IC design development system 102 further includes a rules engine 202 configured to analyze a stored violation to identify a root cause of the failures of the violation (e.g., cross-domain, cross-hierarchy and/or multi-cycle violation) using a rules-based approach. In one embodiment, such violations are analyzed using the rules offline. In one embodiment, such rules are parameterized as discussed further below.

In one embodiment, rules engine 202 identifies the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach. Such a rules-based approach includes rules, which may be provided by an expert, that are targeted for triaging various failures of a violation (e.g., cross-domain, cross-hierarchy and/or multi-cycle violation) that were identified based on analyzing the design of the digital integrated circuit using an electronic design automation tool (e.g., Eagle®, KiCAD®, Pulsonix, Multisim®, Altium Designer®, etc.). "Triaging," as used herein, refers to analyzing the failures, such as to determine the root cause of such failures. In one embodiment, such rules address cross-domain, cross-hierarchy and/or multi-cycle violations, such as by using parameterized thresholds involving multiple domains. For example, such rules may address a cross-domain, cross-hierarchy and multi-cycle violation using parameterized thresholds involving both noise and timing data. For instance, one of the rules could be a noise and timing rule for the noise impact on function (NIOF) violation. Such a rule may be utilized to analyze the relatedness of noise and timing data, where nets (wires that connect components) failing in the noise impact on function violation with high levels of aggressor coupling (noise coupled in from other sources) obtained from noise data are classified differently based on timing slack (margin by which a timing requirement is met or not met) obtained from timing data using user-defined thresholds. Such a cross-domain, cross-hierarchy and multi-cycle triage is important because the root cause will be more effectively identified, which in turn, will provide a better recommendation for addressing such a root cause. For instance, the design approach to address a noise failure may change based on the timing slack (timing data).

In one embodiment, database 104 stores a collection of rules to identify the root cause of violations. Such rules are associated with particular violations. For example, one rule may be used to identify the root cause of a noise impact on function (NIOF) violation. As a result, rules engine 202 identifies a rule to identify the root cause of a violation based on the violation identified by analyzer 201. In one embodiment, such rules and their associated violations are stored in a data structure, where such a data structure is stored in database 104 or in a storage device (e.g., memory, disk unit) of IC design development system 102. In one embodiment, such a data structure is populated by an expert.

In one embodiment, in order to analyze the violation using the appropriate rule, various parameters and data may be obtained by rules engine 202 pertaining to the violation. As discussed above, in one embodiment, such violations include metadata, which includes parameters that were utilized by analyzer 201 to determine that a violation had occurred as well as the relevant data (e.g., noise margins, propagation delay, maximum clock frequencies, steady-state current, transient signal behavior) that was utilized by analyzer 201 to render the decision of a violation. Such parameters and data may be utilized by rules engine 202 in order to identify the root cause of the violation. An example of such a rule is provided in FIG. 3.

Figure 3:
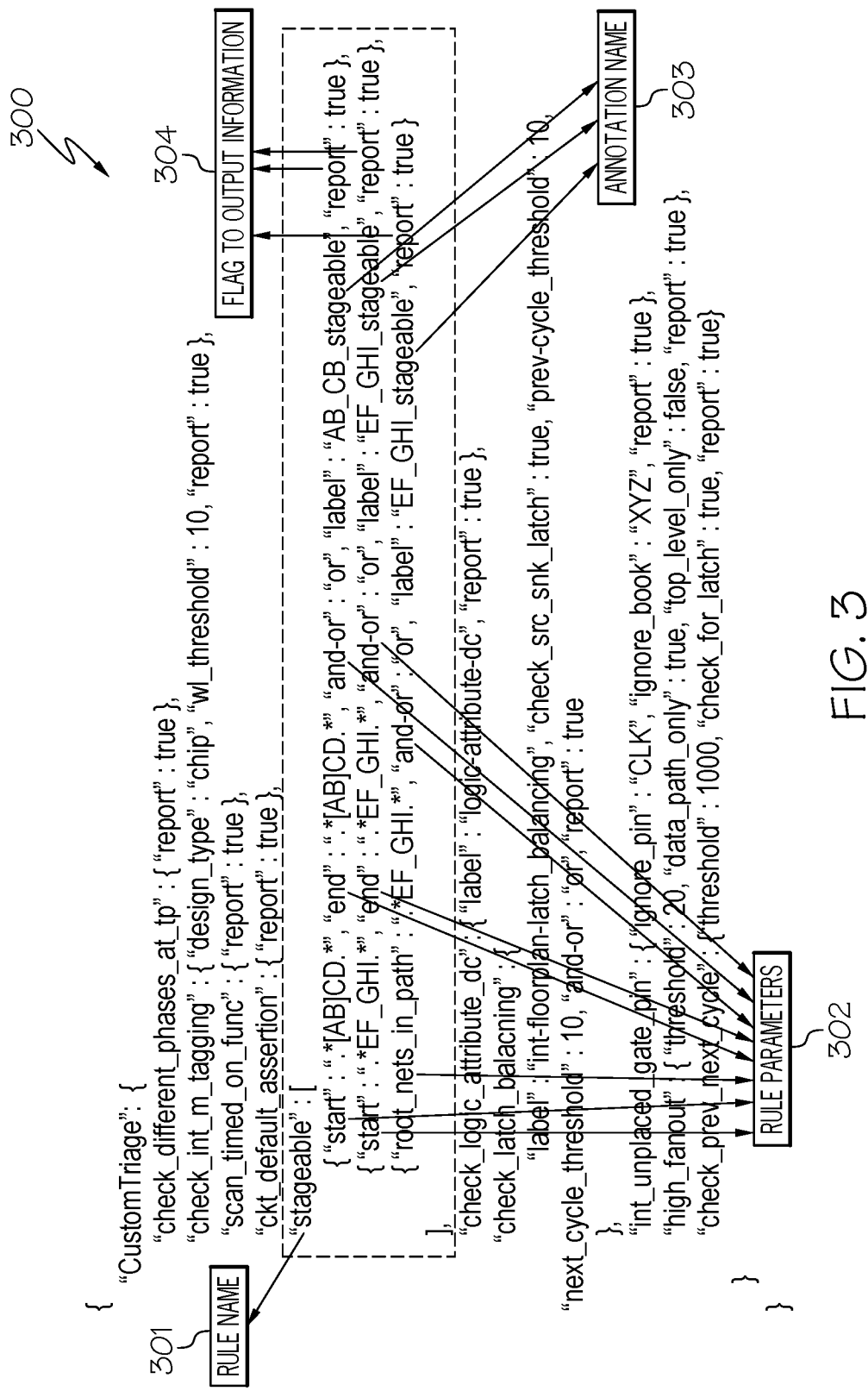
FIG. 3 illustrates the pseudo code of an exemplary rule in accordance with an embodiment of the present disclosure.

FIG. 3 illustrates the pseudo code of an exemplary rule 300 in accordance with an embodiment of the present disclosure.

As shown in FIG. 3, rule 300 may be stored in a file, such as a JavaScript® Object Notation (JSON) file. Furthermore, as shown in FIG. 3, rule 300 includes a rule name 301, rule parameters 302, an annotation name 303 and a flag to output the information 304. "Rule parameters" 302, as used herein, refer to the parameters that are utilized for identifying the root cause of the violation associated with such a rule. "Annotation name" 303, as used herein, refers to the name of the annotation, which corresponds to the added syntactic metadata. A "flag" 304, as used herein, refers to a Boolean variable that signals when a condition (identifying a root cause of the violation) exists in a program. For example, when flag 304 is set to true, it means that the root cause of the violation was identified by rule 300 and that a report (e.g., text report) providing such information should be outputted. In one embodiment, such a report is outputted to the designer, such as the designer of computing device 101. Conversely, when flag 304 is set to false, it means that the root cause of the violation was not identified by rule 300 and that a report providing such information should not be outputted.

Figure 4:
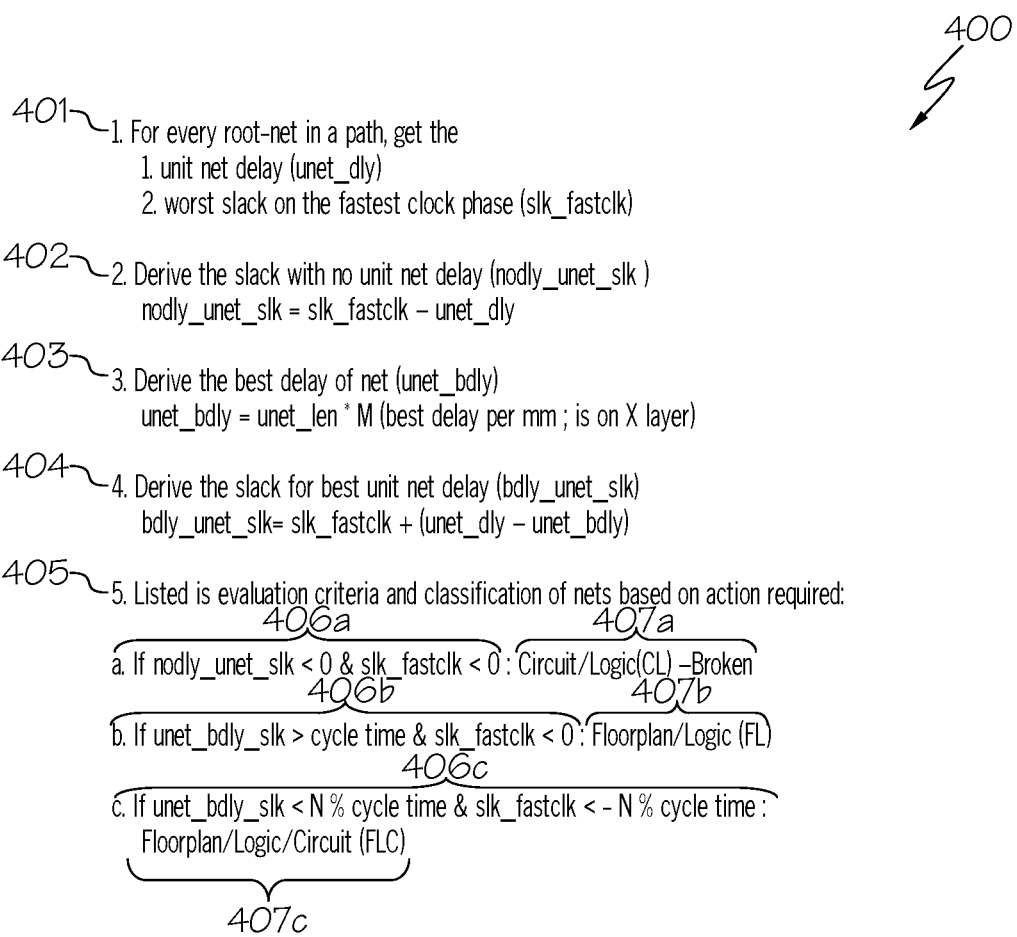
FIG. 4 illustrates the steps of an exemplary rule utilized for identifying a root cause of a violation, such as a timing fault, in accordance with an embodiment of the present disclosure.

A further illustration of a rule identifying a root cause of a violation, such as a timing fault is provided in FIG. 4.

FIG. 4 illustrates the steps of an exemplary rule 400 utilized for identifying a root cause of a violation, such as a timing fault, in accordance with an embodiment of the present disclosure.

As shown in FIG. 4, such a rule 400 utilizes the best delay, no net delay and timing slack (BDNDS) algorithm. For example, the first step 401 involves obtaining the unit net delay (unet_dly) and worst timing slack on the fastest clock phase (slk_fastclk) for every root-net in a path. The second step 402 involves deriving the timing slack with no unit net delay (nodly_unet_slk). The third step 403 involves deriving the best delay of the net (wire that connected components) (unet_bdly). The fourth step 404 involves deriving the timing slack for the best unit net delay (bdly_unet_slk). The fifth step 405 involves the evaluation criteria, which may be provided by a user, as well as the classification of the nets, based on the action required. For instance, based on the evaluation criteria 406a (if nodly_unet_slk<0 & slk-_fastcick<0), and if such criteria is met, then a circuit/logic is deemed to be broken 407A (root cause of violation). In another example, based on the evaluation criteria 406b (if unet_bdly_slk>cycle time & slk_fastclk<0), and if such criteria is met, then a floorplan/logic 407b was the root cause of the violation. In a further example, based on the evaluation criterial 406c (if unet_bdly_slk<N % cycle time & slk_fastclk<−N % cycle time), and if such criteria is met, then a floorplan/logic/circuit 407c was the root cause of the violation. It is noted that the values of the parameters M and N discussed above are specified, such as by the designer, for the particular design in question.

In another example, a rule may be utilized to address a cross-domain, cross-hierarchy and multi-cycle violation using parameterized thresholds involving both noise and timing data. An example of such a rule is shown in FIG. 5 involving a noise and timing rule for the noise impact on function (NIOF) violation.

FIG. 5 illustrates the pseudo code for an exemplary rule 500 for identifying a root cause of a cross-domain, cross-hierarchy and multi-cycle violation of the digital integrated circuit in accordance with an embodiment of the present disclosure.

As shown in FIG. 5, rule 500 analyzes the relatedness of noise and timing data, where nets (wires that connect components) failing in the noise impact on function violation with high levels of aggressor coupling (noise coupled in from other sources) obtained from noise data (see elements 501) are classified differently based on timing slack (margin by which a timing requirement is met or not met) (see elements 502) obtained from timing data traversed across the hierarchy using user-defined thresholds. Such a cross-domain, cross-hierarchy, multi-cycle triage is important because the root cause will be more effectively identified, which in turn, will provide a better recommendation for addressing such a root cause. For instance, the design approach to address a noise failure may change based on the timing slack (timing data).

Returning to FIG. 2, as previously discussed, such rules associated with violations may be populated in a data structure by an expert. Alternatively, in one embodiment, such rules are generated using a model trained by a machine learning algorithm.

In one embodiment, rules engine 202 trains a model to create an appropriate rule for identifying the root cause of a particular violation (e.g., NIOF violation) based on the parameters (e.g., voltage transfer characteristics, noise margins, fanout, power dissipation, propagation delay times and the interrelationships among these parameters) and data (e.g., noise margins, propagation delay, maximum clock frequencies, steady-state current, transient signal behavior) that was utilized by analyzer 201 in rendering the decision of a violation.

In one embodiment, rules engine 202 uses a machine learning algorithm (e.g., supervised learning) to build the model to create a rule to identify the root cause of a violation using a sample data set containing a rule and an associated violation, including the parameters (e.g., voltage transfer characteristics, noise margins, fanout, power dissipation, propagation delay times and the interrelationships among these parameters) and data (e.g., noise margins, propagation delay, maximum clock frequencies, steady-state current, transient signal behavior) that was utilized by analyzer 201 in rendering the decision of a violation.

Such a sample data set is referred to herein as the "training data," which is used by the machine learning algorithm to make predictions or decisions as to the rule that should be created in identifying the root cause of the violation. The algorithm iteratively makes predictions on the training data as to the rule that should be created to identify the root cause of the violation until the predictions achieve the desired accuracy as determined by an expert. Examples of such learning algorithms include nearest neighbor, Naïve Bayes, decision trees, linear regression, support vector machines and neural networks.

In one embodiment, after training the model to create a rule to identify the root cause of a violation based on the metadata of the violation (metadata of the violation, including the parameters and data), such a model is utilized by rules engine 202 to create a rule based on providing the trained model the metadata (e.g., parameters and data) of the violation received from analyzer 201.

Furthermore, as shown in FIG. 2, IC design development system 102 includes a recommender engine 203 configured to recommend a design change in designing the digital integrated circuit based on the root cause of the violation identified by rules engine 202.

For example, in one embodiment, recommender engine 203 utilizes a data structure (e.g., table) that includes a listing of design recommendations based on identified root causes. For example, recommender engine 203 may recommend replacing the NAND logic gate (small NAND logic gate) identified by number 100122 in the design with the NAND logic gate (large NAND logic gate) identified by number 102233 receiving digital signals identified by numbers 122233, 132343, and 122343 when the rule indicates that the root cause of the NIOF violation was a coupling failure at the NAND logic gate identified by number 100122 in the design. In one embodiment, such a data structure is populated by an expert. In one embodiment, such a data structures resides within a storage device (e.g., memory, disk drive) of IC design development system 102.

In one embodiment, such recommendations may be generated using a model (mathematical model) that has been trained using a machine learning algorithm for providing a recommendation based on the identified root cause of the violation as discussed in further detail below.

In one embodiment, recommender engine 203 trains a model to recommend an appropriate design change in the design of the digital integrated circuit based on the root cause of the violation.

In one embodiment, recommender engine 203 uses a machine learning algorithm (e.g., supervised learning) to build the model to recommend the appropriate design change in the design of the digital integrated circuit using a sample data set containing the design change in the design of the digital integrated circuit and the identified root cause of the violation. In one embodiment, such a data set is provided by an expert.

Such a sample data set is referred to herein as the "training data," which is used by the machine learning algorithm to make predictions or decisions as to the design change in the design of the digital integrated circuit based on the root cause of the violation. The algorithm iteratively makes predictions on the training data as to the design change until the predictions achieve the desired accuracy as determined by an expert. Examples of such learning algorithms include nearest neighbor, Naïve Bayes, decision trees, linear regression, support vector machines and neural networks.

In one embodiment, after training the model to make predictions or decisions as to the design change in the design of the digital integrated circuit based on the root cause of the violation, such a model is utilized by recommender engine 203 to recommend a design change to the design of the digital integrated circuit based on the root cause of the violation identified by rules engine 202.

In one embodiment, recommender engine 203 annotates database 104 with the recommended design change.

In one embodiment, recommender engine 203 implements the design change based on the recommendation. For example, if recommender engine 203 recommends replacing the NAND logic gate (small NAND logic gate) identified by number 100122 in the design with the NAND logic gate (large NAND logic gate) identified by number 102233 receiving digital signals identified by numbers 122233, 132343, and 122343, then recommender engine 203 proceeds with replacing the NAND logic gate identified by number 100122 in the design with the NAND logic gate identified by number 102233.

In one embodiment, recommender engine 203 simply provides such a recommendation to the designer, such as the user of computing device 101, and allows the designer to decide whether or not to implement such a design change in the design of the digital integrated circuit. In one embodiment, such a recommendation is in the format of a report (e.g., text report).

A further description of these and other features is provided below in connection with the discussion of the method for recommending changes in the design of the digital integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach.

Figure 6:
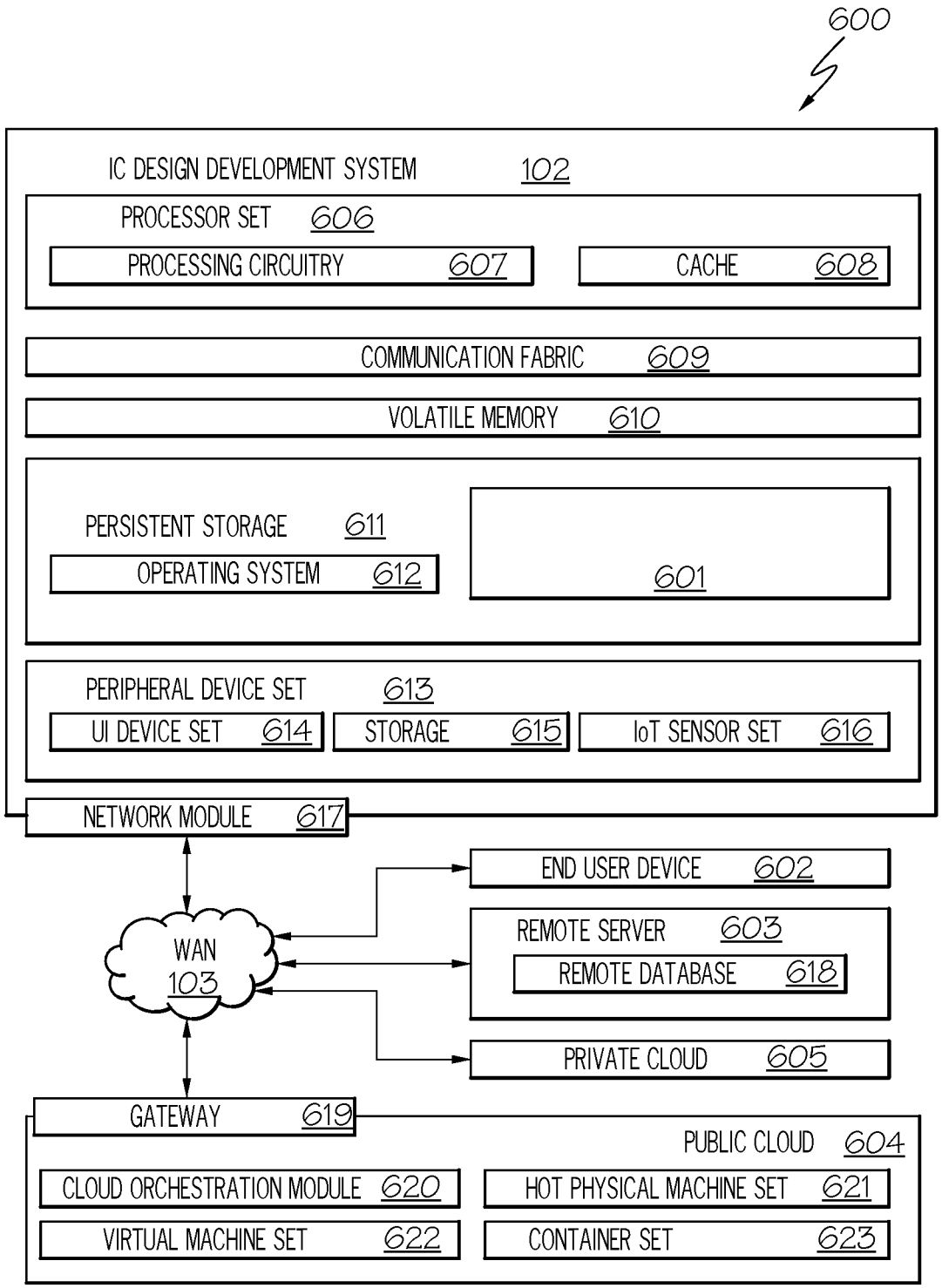
FIG. 6 illustrates an embodiment of the present disclosure of the hardware configuration of the IC design development system which is representative of a hardware environment for practicing the present disclosure.

Prior to the discussion of the method for recommending changes in the design of an integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach, a description of the hardware configuration of IC design development system 102 (FIG. 1) is provided below in connection with FIG. 6.

Referring now to FIG. 6, in conjunction with FIG. 1, FIG. 6 illustrates an embodiment of the present disclosure of the hardware configuration of IC design development system 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code 601 involved in performing the inventive methods, such as recommending changes in the design of an integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach. In addition to block 601, computing environment 600 includes, for example, IC design development system 102, network 103, such as a wide area network (WAN), end user device (EUD) 602, remote server 603, public cloud 604, and private cloud 605. In this embodiment, IC design development system 102 includes processor set 606 (including processing circuitry 607 and cache 608), communication fabric 609, volatile memory 610, persistent storage 611 (including operating system 612 and block 601, as identified above), peripheral device set 613 (including user interface (UI) device set 614, storage 615, and Internet of Things (IoT) sensor set 616), and network module 617. Remote server 603 includes remote database 618. Public cloud 604 includes gateway 619, cloud orchestration module 620, host physical machine set 621, virtual machine set 622, and container set 623.

IC design development system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 618. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically IC design development system 102, to keep the presentation as simple as possible. IC design development system 102 may be located in a cloud, even though it is not shown in a cloud in FIG. 6. On the other hand, IC design development system 102 is not required to be in a cloud except to any extent as may be affirmatively indicated.

Processor set 606 includes one, or more, computer processors of any type now known or to be developed in the future. Processing circuitry 607 may be distributed over multiple packages, for example, multiple, coordinated integrated circuit chips. Processing circuitry 607 may implement multiple processor threads and/or multiple processor cores. Cache 608 is memory that is located in the processor chip package(s) and is typically used for data or code that should be available for rapid access by the threads or cores running on processor set 606. Cache memories are typically organized into multiple levels depending upon relative proximity to the processing circuitry. Alternatively, some, or all, of the cache for the processor set may be located "off chip." In some computing environments, processor set 606 may be designed for working with qubits and performing quantum computing.

Computer readable program instructions are typically loaded onto IC design development system 102 to cause a series of operational steps to be performed by processor set 606 of IC design development system 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 608 and the other storage media discussed below. The program instructions, and associated data, are accessed by processor set 606 to control and direct performance of the inventive methods. In computing environment 600, at least some of the instructions for performing the inventive methods may be stored in block 601 in persistent storage 611.

Communication fabric 609 is the signal conduction paths that allow the various components of IC design development system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 610 is any type of volatile memory now known or to be developed in the future. Examples include dynamic type random access memory (RAM) or static type RAM. Typically, the volatile memory is characterized by random access, but this is not required unless affirmatively indicated. In IC design development system 102, the volatile memory 610 is located in a single package and is internal to IC design development system 102, but, alternatively or additionally, the volatile memory may be distributed over multiple packages and/or located externally with respect to IC design development system 102.

Persistent Storage 611 is any form of non-volatile storage for computers that is now known or to be developed in the future. The non-volatility of this storage means that the stored data is maintained regardless of whether power is being supplied to IC design development system 102 and/or directly to persistent storage 611. Persistent storage 611 may be a read only memory (ROM), but typically at least a portion of the persistent storage allows writing of data, deletion of data and re-writing of data. Some familiar forms of persistent storage include magnetic disks and solid state storage devices. Operating system 612 may take several forms, such as various known proprietary operating systems or open source Portable Operating System Interface type operating systems that employ a kernel. The code included in block 601 typically includes at least some of the computer code involved in performing the inventive methods.

Peripheral device set 613 includes the set of peripheral devices of IC design development system 102. Data communication connections between the peripheral devices and the other components of IC design development system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 614 may include components such as a display screen, speaker, microphone, wearable devices (such as goggles and smart watches), keyboard, mouse, printer, touchpad, game controllers, and haptic devices. Storage 615 is external storage, such as an external hard drive, or insertable storage, such as an SD card. Storage 615 may be persistent and/or volatile. In some embodiments, storage 615 may take the form of a quantum computing storage device for storing data in the form of qubits. In embodiments where IC design development system 102 is required to have a large amount of storage (for example, where IC design development system 102 locally stores and manages a large database) then this storage may be provided by peripheral storage devices designed for storing very large amounts of data, such as a storage area network (SAN) that is shared by multiple, geographically distributed computers. IoT sensor set 616 is made up of sensors that can be used in Internet of Things applications. For example, one sensor may be a thermometer and another sensor may be a motion detector.

Network module 617 is the collection of computer software, hardware, and firmware that allows IC design development system 102 to communicate with other computers through WAN 103. Network module 617 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 617 are performed on the same physical hardware device. In other embodiments (for example, embodiments that utilize software-defined networking (SDN)), the control functions and the forwarding functions of network module 617 are performed on physically separate devices, such that the control functions manage several different network hardware devices. Computer readable program instructions for performing the inventive methods can typically be downloaded to IC design development system 102 from an external computer or external storage device through a network adapter card or network interface included in network module 617.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 602 is any computer system that is used and controlled by an end user (for example, a customer of an enterprise that operates IC design development system 102), and may take any of the forms discussed above in connection with IC design development system 102. EUD 602 typically receives helpful and useful data from the operations of IC design development system 102. For example, in a hypothetical case where IC design development system 102 is designed to provide a recommendation to an end user, this recommendation would typically be communicated from network module 617 of IC design development system 102 through WAN 103 to EUD 602. In this way, EUD 602 can display, or otherwise present, the recommendation to an end user. In some embodiments, EUD 602 may be a client device, such as thin client, heavy client, mainframe computer, desktop computer and so on.

Remote server 603 is any computer system that serves at least some data and/or functionality to IC design development system 102. Remote server 603 may be controlled and used by the same entity that operates IC design development system 102. Remote server 603 represents the machine(s) that collect and store helpful and useful data for use by other computers, such as IC design development system 102. For example, in a hypothetical case where IC design development system 102 is designed and programmed to provide a recommendation based on historical data, then this historical data may be provided to IC design development system 102 from remote database 618 of remote server 603.

Public cloud 604 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 604 is performed by the computer hardware and/or software of cloud orchestration module 620. The computing resources provided by public cloud 604 are typically implemented by virtual computing environments that run on various computers making up the computers of host physical machine set 621, which is the universe of physical computers in and/or available to public cloud 604. The virtual computing environments (VCEs) typically take the form of virtual machines from virtual machine set 622 and/or containers from container set 623. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 619 is the collection of computer software, hardware, and firmware that allows public cloud 604 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 605 is similar to public cloud 604, except that the computing resources are only available for use by a single enterprise. While private cloud 605 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 604 and private cloud 605 are both part of a larger hybrid cloud.

Block 601 further includes the software components discussed above in connection with FIGS. 2-5 to recommend changes in the design of a digital integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach. In one embodiment, such components may be implemented in hardware. The functions discussed above performed by such components are not generic computer functions. As a result, IC design development system 102 is a particular machine that is the result of implementing specific, non-generic computer functions.

In one embodiment, the functionality of such software components of IC design development system 102, including the functionality for recommending changes in the design of an integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach may be embodied in an application specific integrated circuit.

As stated above, in the design of digital integrated circuits, such a design is tested and analyzed using various EDA tools to identify various violations, such as timing or noise failures. A "timing failure" is a failure of a process or part of a process in a synchronous distributed system or real-time system to meet limits set on execution, message delivery, clock drift rate or clock skew. A "noise failure" refers to unexpected variations in voltage due to a variety of factors, such as signal transitions on neighboring wires, that can potentially cause disruptions or damage in electrical circuits. When such simulated failures occur (e.g., timing and noise failures), the designer attempts to identify the root cause of such failures. However, such an analysis (referred to as "triaging") is time consuming and difficult. Furthermore, such failures (e.g., timing and noise failures) could be correlated. However, such correlations are difficult to assess thereby making it difficult to identify the root cause of such failures. Additionally, such failures (e.g., timing and noise failures) may involve integration-level issues between components located at different hierarchies of the integrated circuit. For example, a multiple-cycle path may extend over many components located at different hierarchies of the integrated circuit. An analysis of such issues may involve analyzing each of the multiple hierarchical components individually, which is extremely difficult, thereby making it difficult to identify the root cause of such failures. Consequently, there is not currently a means for effectively identifying the root cause of failures, such as timing and noise failures, in the design of digital integrated circuits.

The embodiments of the present disclosure provide a means for effectively identifying the root cause of failures, such as timing and noise failures, in the design of digital integrated circuits using an offline analysis of cross-domain, cross-hierarchy and/or multi-cycle violations of the digital integrated circuit using a rules-based approach as discussed below in connection with FIG. 7.

Figure 7:
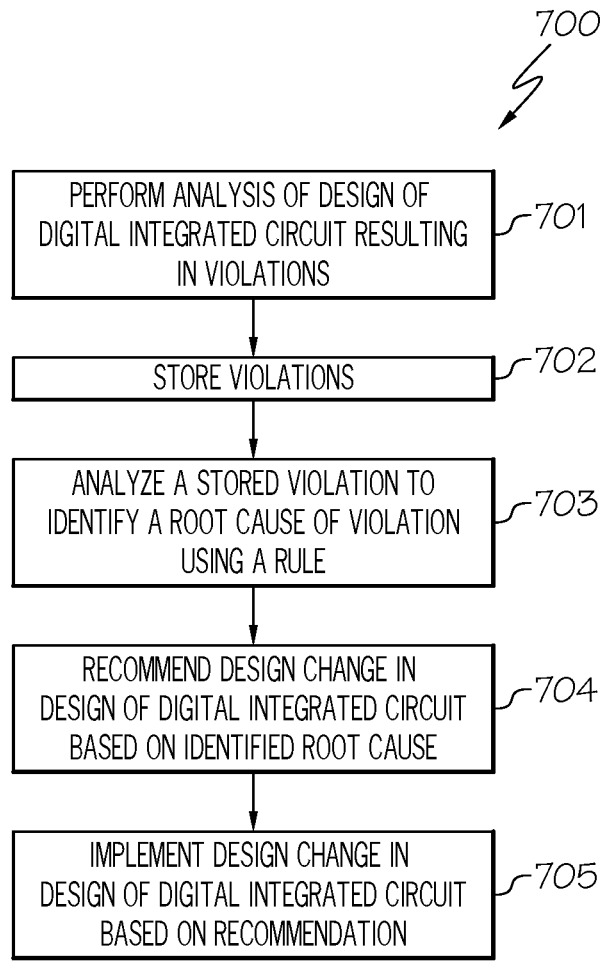
FIG. 7 is a flowchart of a method for recommending changes in the design of an integrated circuit based on effectively identifying the root cause of failures in the design of the digital integrated circuit using an offline analysis of cross-domain, cross-hierarchy and/or multi-cycle violations of the digital integrated circuit using a rules-based approach in accordance with an embodiment of the present disclosure.

FIG. 7 is a flowchart of a method 700 for recommending changes in the design of an integrated circuit based on effectively identifying the root cause of failures, such as timing and noise failures, in the design of the digital integrated circuit using an offline analysis of cross-domain, cross-hierarchy and/or multi-cycle violations of the digital integrated circuit using a rules-based approach in accordance with an embodiment of the present disclosure.

Referring to FIG. 7, in conjunction with FIGS. 1-6, in operation 701, analyzer 201 of IC design development system 102 performs an analysis of the digital integrated circuit being designed by a designer (e.g., user of computing device 101). In one embodiment, such an analysis results in violations being identified.

As discussed above, in one embodiment, such an analysis may involve verification and simulation of the design of the digital integrated circuit based on various characteristics or parameters, such as voltage transfer characteristics, noise margins, fanout, power dissipation, propagation delay times and the interrelationships among these parameters.

In one embodiment, analyzer 201 analyzes the design of the digital integrated circuit to ensure that it conforms to the functional or parametric specifications, which may be provided by the designer (e.g., user of computing device 101). For example, analyzer 201 may analyze the design of the digital integrated circuit to determine if every logic gate is functioning according to its truth table specification. In another example, analyzer 201 determines if the electrical paths in the design are identical to those in the device.

Furthermore, in one embodiment, analyzer 201 performs parametric tests on the design of the digital integrated circuit based on the analysis of a continuous circuit parameter. For example, analyzer 201 may determine if the steady-state current requirements of the device are excessive. In another example, analyzer 201 determines if the effects of process variations are within tolerance. In a further example, analyzer 201 determines if the performance requirements (e.g., delay fault) are met.

Additionally, in one embodiment, parametric tests may include analyzing continuous circuit variables, such as noise margins, propagation delay, maximum clock frequencies, steady-state current, transient signal behavior, etc. In one embodiment, such parameters are checked under a number of different temperature and supply voltages.

In one embodiment, analyzer 201 utilizes various software tools (e.g., electronic design automation (EDA) tools) for performing such analysis of the design of the digital integrated circuit, including, but not limited to, Cadence®, Synopsys®, Mentor Graphics®, Atrenta, etc.

As a result of performing such analysis on the design of a digital integrated circuit, violations may be detected. A "violation," as used herein, refers to the performance of a component or system in the design of the digital integrated circuit not meeting a required specification, such as provided by the designer, resulting in a fault (e.g., noise failure, timing failure, power failure, etc.). In one embodiment, such violations include "cross-domain," "cross-hierarchy" and/or "multi-cycle" violations.

"Cross-domain," as used herein, involves multiple types of failures, such as timing failures and noise failures. A "timing failure," as used herein, refers to a failure of a process or part of a process in a synchronous distributed system or real-time system to meet limits set on execution, message delivery, clock drift rate or clock skew. A "noise failure," as used herein, refers to unexpected variations in voltage due to a variety of factors, such as signal transitions on neighboring wires, that can potentially cause disruptions or damage in electrical circuits. "Cross-hierarchy," as used herein, involves multiple levels of the integrated circuit design. "Multi-cycle," as used herein, involves a multiple-cycle path extended over many components.

In one embodiment, such violations are identified as a result of the analysis performed by the software tools (e.g., EDA tools) discussed above. For example, EDA tools may identify faults at the logic level corresponding to timing failures, noise failures, power failures, etc.

In one embodiment, such violations are stored, such as in database 104. In one embodiment, such stored violations also include metadata, which includes parameters that were utilized by analyzer 201 to determine that a violation had occurred. Furthermore, such metadata includes the relevant data (e.g., noise margins, propagation delay, maximum clock frequencies, steady-state current, transient signal behavior) that was utilized by analyzer 201 to render the decision of a violation.

In operation 702, analyzer 201 of IC design development system 102 stores the violations, such as in database 104.

As stated above, such stored violations also include metadata, which includes parameters that were utilized by analyzer 201 to determine that a violation had occurred. Furthermore, such metadata includes the relevant data (e.g., noise margins, propagation delay, maximum clock frequencies, steady-state current, transient signal behavior) that was utilized by analyzer 201 to render the decision of a violation.

In operation 703, rules engine 202 of IC design development system 102 analyzes a stored violation to identify a root cause of the violation using a rule.

As discussed above, in one embodiment, such violations are analyzed using the rules offline. In one embodiment, such rules are parameterized as discussed further below.

In one embodiment, rules engine 202 identifies the root cause of failures, such as timing and noise failures, in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach. Such a rules-based approach includes rules, which may be provided by an expert, that are targeted for triaging various failures of a violation (e.g., cross-domain, cross-hierarchy and/or multi-cycle violation)

that were identified based on analyzing the design of the digital integrated circuit using an electronic design automation tool (e.g., Eagle®, KiCAD®, Pulsonix, Multisim®, Altium Designer®, etc.). "Triaging," as used herein, refers to analyzing the failures, such as to determine the root cause of such failures. In one embodiment, such rules address cross-domain, cross-hierarchy and/or multi-cycle violations, such as by using parameterized thresholds involving multiple domains. For example, such rules may address a cross-domain, cross-hierarchy and multi-cycle violation using parameterized thresholds involving both noise and timing data. For instance, one of the rules could be a noise and timing rule for the noise impact on function (NIOF) violation. Such a rule may be utilized to analyze the relatedness of noise and timing data, where nets (wires that connect components) failing in the noise impact on function violation with high levels of aggressor coupling (noise coupled in from other sources) obtained from noise data are classified differently based on timing slack (margin by which a timing requirement is met or not met) obtained from timing data using user-defined thresholds. Such a cross-domain, cross-hierarchy and multi-cycle triage is important because the root cause will be more effectively identified, which in turn, will provide a better recommendation for addressing such a root cause. For instance, the design approach to address a noise failure may change based on the timing slack (timing data).

In one embodiment, database 104 stores a collection of rules to identify the root cause of violations. Such rules are associated with particular violations. For example, one rule may be used to identify the root cause of a noise impact on function (NIOF) violation. As a result, rules engine 202 identifies a rule to identify the root cause of a violation based on the violation identified by analyzer 201. In one embodiment, such rules and their associated violations are stored in a data structure, where such a data structure is stored in database 104 or in a storage device (e.g., storage device 611, 615) of IC design development system 102. In one embodiment, such a data structure is populated by an expert.

In one embodiment, in order to analyze the violation using the appropriate rule, various parameters and data may be obtained by rules engine 202 pertaining to the violation. As discussed above, in one embodiment, such violations include metadata, which includes parameters that were utilized by analyzer 201 to determine that a violation had occurred as well as the relevant data (e.g., noise margins, propagation delay, maximum clock frequencies, steady-state current, transient signal behavior) that was utilized by analyzer 201 to render the decision of a violation. Such parameters and data may be utilized by rules engine 202 in order to identify the root cause of the violation. An example of such a rule is provided in FIG. 3.

A further illustration of a rule identifying a root cause of a violation, such as a timing fault is provided in FIG. 4.

In another example, a rule may be utilized to address a cross-domain, cross-hierarchy and multi-cycle violation using parameterized thresholds involving both noise and timing data. An example of such a rule is shown in FIG. 5 involving a noise and timing rule for the noise impact on function (NIOF) violation.

Furthermore, as previously discussed, such rules associated with violations may be populated in a data structure by an expert. Alternatively, in one embodiment, such rules are generated using a model trained by a machine learning algorithm.

In one embodiment, rules engine 202 trains a model to create an appropriate rule for identifying the root cause of a particular violation (e.g., NIOF violation) based on the parameters (e.g., voltage transfer characteristics, noise margins, fanout, power dissipation, propagation delay times and the interrelationships among these parameters) and data (e.g., noise margins, propagation delay, maximum clock frequencies, steady-state current, transient signal behavior) that was utilized by analyzer 201 in rendering the decision of a violation.

In one embodiment, rules engine 202 uses a machine learning algorithm (e.g., supervised learning) to build the model to create a rule to identify the root cause of a violation using a sample data set containing a rule and an associated violation, including the parameters (e.g., voltage transfer characteristics, noise margins, fanout, power dissipation, propagation delay times and the interrelationships among these parameters) and data (e.g., noise margins, propagation delay, maximum clock frequencies, steady-state current, transient signal behavior) that was utilized by analyzer 201 in rendering the decision of a violation.

Such a sample data set is referred to herein as the "training data," which is used by the machine learning algorithm to make predictions or decisions as to the rule that should be created in identifying the root cause of the violation. The algorithm iteratively makes predictions on the training data as to the rule that should be created to identify the root cause of the violation until the predictions achieve the desired accuracy as determined by an expert. Examples of such learning algorithms include nearest neighbor, Naïve Bayes, decision trees, linear regression, support vector machines and neural networks.

In one embodiment, after training the model to create a rule to identify the root cause of a violation based on the metadata of the violation (metadata of the violation, including the parameters and data), such a model is utilized by rules engine 202 to create a rule based on providing the trained model the metadata (e.g., parameters and data) of the violation received from analyzer 201.

In operation 704, recommender engine 203 of IC design development system 102 recommends a design change in designing the digital integrated circuit based on the root cause of the violation identified by rules engine 202.

For example, as discussed above, in one embodiment, recommender engine 203 utilizes a data structure (e.g., table) that includes a listing of design recommendations based on identified root causes. For example, recommender engine 203 may recommend replacing the NAND logic gate (small NAND logic gate) identified by number 100122 in the design with the NAND logic gate (large NAND logic gate) identified by number 102233 receiving digital signals identified by numbers 122233, 132343, and 122343 when the rule indicates that the root cause of the NIOF violation was a coupling failure at the NAND logic gate identified by number 100122 in the design. In one embodiment, such a data structure is populated by an expert. In one embodiment, such a data structures resides within a storage device (e.g., storage device 611, 615) of IC design development system 102.

In one embodiment, such recommendations may be generated using a model (mathematical model) that has been trained using a machine learning algorithm for providing a recommendation based on the identified root cause of the violation.

In one embodiment, recommender engine 203 trains a model to recommend an appropriate design change in the design of the digital integrated circuit based on the root cause of the violation.

In one embodiment, recommender engine 203 uses a machine learning algorithm (e.g., supervised learning) to build the model to recommend the appropriate design change in the design of the digital integrated circuit using a sample data set containing the design change in the design of the digital integrated circuit and the identified root cause of the violation. In one embodiment, such a data set is provided by an expert.

Such a sample data set is referred to herein as the "training data," which is used by the machine learning algorithm to make predictions or decisions as to the design change in the design of the digital integrated circuit based on the root cause of the violation. The algorithm iteratively makes predictions on the training data as to the design change until the predictions achieve the desired accuracy as determined by an expert. Examples of such learning algorithms include nearest neighbor, Naïve Bayes, decision trees, linear regression, support vector machines and neural networks.

In one embodiment, after training the model to make predictions or decisions as to the design change in the design of the digital integrated circuit based on the root cause of the violation, such a model is utilized by recommender engine 203 to recommend a design change to the design of the digital integrated circuit based on the root cause of the violation identified by rules engine 202.

In one embodiment, recommender engine 203 annotates database 104 with the recommended design change.

In operation 705, recommender engine 203 of IC design development system 102 implements the design change based on the recommendation. For example, if recommender engine 203 recommends replacing the NAND logic gate (small NAND logic gate) identified by number 100122 in the design with the NAND logic gate (large NAND logic gate) identified by number 102233 receiving digital signals identified by numbers 122233, 132343, and 122343, then recommender engine 203 proceeds with replacing the NAND logic gate identified by number 100122 in the design with the NAND logic gate identified by number 102233.

In one embodiment, recommender engine 203 simply provides such a recommendation to the designer, such as the user of computing device 101, and allows the designer to decide whether or not to implement such a design change in the design of the digital integrated circuit. In one embodiment, such a recommendation is in the format of a report (e.g., text report).

As a result of the foregoing, the principles of the present disclosure provide a means for effectively identifying the root cause of failures, such as timing and noise failures, in the design of digital integrated circuits using an offline analysis of cross-domain, cross-hierarchy and/or multi-cycle violations of the digital integrated circuit using a rules-based approach.

Furthermore, the principles of the present disclosure improve the technology or technical field involving integrated circuit design. As discussed above, in the design of digital integrated circuits, such a design is tested and analyzed using various EDA tools to identify various violations, such as timing or noise failures. A "timing failure" is a failure of a process or part of a process in a synchronous distributed system or real-time system to meet limits set on execution, message delivery, clock drift rate or clock skew. A "noise failure," as used herein, refers to unexpected random variations in voltage that can potentially cause disruptions or damage in electrical circuits. When such simulated failures occur (e.g., timing and noise failures), the designer attempts to identify the root cause of such failures. However, such an analysis (referred to as "triaging") is time consuming and difficult. Furthermore, such failures (e.g., timing and noise failures) could be correlated. However, such correlations are difficult to assess thereby making it difficult to identify the root cause of such failures. Additionally, such failures (e.g., timing and noise failures) may involve integration-level issues between components located at different hierarchies of the integrated circuit. For example, a multiple-cycle path may extend over many components located at different hierarchies of the integrated circuit. An analysis of such issues may involve analyzing each of the multiple hierarchical components individually, which is extremely difficult, thereby making it difficult to identify the root cause of such failures. Consequently, there is not currently a means for effectively identifying the root cause of failures, such as timing and noise failures, in the design of digital integrated circuits.

Embodiments of the present disclosure improve such technology by performing an analysis of the digital integrated circuit being designed, where the result of such an analysis involves violations being identified and stored. A "violation," as used herein, refers to the performance of a component or system in the design of the digital integrated circuit not meeting a required specification, such as provided by the designer, resulting in a fault (e.g., noise failure, timing failure, power failure, etc.). In one embodiment, such an analysis may involve verification and simulation of the design of the digital integrated circuit based on various characteristics or parameters, such as voltage transfer characteristics, noise margins, fanout, power dissipation, propagation delay times and the interrelationships among these parameters. In one embodiment, such an analysis ensures that it conforms to the functional or parametric specifications, which may be provided by the designer. A stored violation may then be analyzed to identify a root cause of the violation, including a cross-domain, cross-hierarchy and/or multi-cycle violation, using a rule. "Cross-domain," as used herein, involves multiple types of failures, such as timing failures and noise failures. "Cross-hierarchy," as used herein, involves multiple levels of the integrated circuit design. "Multi-cycle," as used herein, involves a multiple-cycle path extended over many components. In one embodiment, such violations are analyzed using the rules offline. In one embodiment, such rules are parameterized. In one embodiment, the cross-domain, cross-hierarchy and/or multi-cycle violation, such as involving timing and noise failures, is identified using an offline analysis of the violation of the digital integrated circuit using a rules-based approach. Such a rules-based approach includes rules that are targeted for triaging various failures of the cross-domain, cross-hierarchy and/or multi-cycle violation that were identified based on analyzing the design of the digital integrated circuit using an electronic design automation tool (e.g., Eagle®, KiCAD®, Pulsonix, Multisim®, Altium Designer®, etc.). "Triaging," as used herein, refers to analyzing the failures, such as to determine the root cause of such failures. In one embodiment, such rules address cross-domain, cross-hierarchy and/or multi-cycle violations, such as by using parameterized thresholds involving multiple domains. Furthermore, such rules may address a violation that involves a path that traverses a hierarchy in the design of the digital integrated circuit. The "hierarchy," as used herein, refers to the levels of the digital integrated circuit, where each level includes one or more components of the digital integrated circuit. Additionally, such rules may address a violation involving a multiple-cycle path extended over many components. A design change in the design of the digital integrated circuit may then be recommended based on the identified root cause of the violation, such as a cross-domain violation. In one embodiment, such a recommendation is based on utilizing a data structure (e.g., table) that includes a listing of design recommendations based on the identified root causes. In one embodiment, such recommendations may be generated using a model (mathematical model) that has been trained using a machine learning algorithm for providing a recommendation based on the identified root cause of the violation, such as a cross-domain violation. In one embodiment, the recommended design change is implemented in the design of the digital integrated circuit. In this manner, the root cause of failures, such as timing and noise failures, are effectively identified in the design of digital integrated circuits using an offline analysis of cross-domain (e.g., timing and noise failures), cross-hierarchy (multiple levels of the integrated circuit design) and/or multi-cycle (multiple-cycle path extended over many components) violations of the digital integrated circuit using a rules-based approach. Furthermore, in this manner, there is an improvement in the technical field involving integrated circuit design.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for recommending design changes in designing a digital integrated circuit comprises performing an analysis of the digital integrated circuit resulting in a plurality of violations. The method further comprises analyzing one of the plurality of violations to identify a root cause of the one of the plurality of violations involving a cross-domain, a cross-hierarchy and/or a multi-cycle violation using a rule. The method additionally comprises recommending a design change in designing the digital integrated circuit for the one of the plurality of violations based on the identified root cause.

Furthermore, in one embodiment of the present disclosure, the method additionally comprises that the rule addresses the violation using parameterized thresholds involving both noise and timing data.

Additionally, in one embodiment of the present disclosure, the method further comprises that the rule addresses the violation involving a path that traverses a hierarchy in a design of the digital integrated circuit.

Furthermore, in one embodiment of the present disclosure, the method additionally comprises that the rule is parameterized.

Additionally, in one embodiment of the present disclosure, the method further comprises that the one of the plurality of violations is analyzed using the rule offline.

Furthermore, in one embodiment of the present disclosure, the method additionally comprises that the plurality of violations comprises timing and noise failures found using electronic design automation tools.

Additionally, in one embodiment of the present disclosure, the method further comprises implementing the design change based on the recommendation.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for recommending design changes in designing a digital integrated circuit, the method comprising:
performing an analysis of said digital integrated circuit resulting in a plurality of violations, wherein said analysis comprises performing parametric tests on a design of said digital integrated circuit based on an analysis of a continuous circuit parameter, wherein said parametric tests comprise analyzing continuous circuit variables;
storing said plurality of violations, wherein said stored violations comprise metadata which includes parameters that were utilized to determine that a violation had occurred;
analyzing one of said stored violations to identify a root cause of said one of said stored violations involving a cross-domain, a cross-hierarchy and a multi-cycle violation using a rule, wherein said rule is targeted for triaging said cross-domain, said cross-hierarchy and said multi-cycle violation that was identified based on said analysis of said digital integrated circuit; and
generating a recommendation of a design change in designing said digital integrated circuit for said one of said stored violations based on said identified root cause.

2. The method as recited in claim 1, wherein said rule addresses said violation using parameterized thresholds involving both noise and timing data.

3. The method as recited in claim 1, wherein said rule addresses said violation involving a path that traverses a hierarchy in said design of said digital integrated circuit.

4. The method as recited in claim 1, wherein said rule is parameterized.

5. The method as recited in claim 1 further comprising:
training a model to create an appropriate rule for identifying a root cause of a particular violation based on parameters and data that were utilized in rendering a decision of a violation; and
creating a rule based on providing said trained model parameters and data of a violation identified from said analysis of said digital integrated circuit.

6. The method as recited in claim 1, wherein said continuous circuit variables comprise noise margins, propagation delay, maximum clock frequencies, steady-state current, and transient signal behavior.

7. The method as recited in claim 1 further comprising:
implementing said design change based on said recommendation, wherein said recommendation is generated based on a data structure listing design recommendations based on identified root causes or a machine learning model trained to recommend a design change of said digital integrated circuit based on a root cause of a violation.

8. A computer program product for recommending design changes in designing a digital integrated circuit, the computer program product comprising one or more computer readable storage mediums having program code embodied therewith, the program code comprising programming instructions for:

performing an analysis of said digital integrated circuit resulting in a plurality of violations, wherein said analysis comprises performing parametric tests on a design of said digital integrated circuit based on an analysis of a continuous circuit parameter, wherein said parametric tests comprise analyzing continuous circuit variables;

storing said plurality of violations, wherein said stored violations comprise metadata which includes parameters that were utilized to determine that a violation had occurred;

analyzing one of said stored violations to identify a root cause of said one of said stored violations involving a cross-domain, a cross-hierarchy and a multi-cycle violation using a rule, wherein said rule is targeted for triaging said cross-domain, said cross-hierarchy and said multi-cycle violation that was identified based on said analysis of said digital integrated circuit; and generating a recommendation of a design change in designing said digital integrated circuit for said one of said stored violations based on said identified root cause.

9. The computer program product as recited in claim 8, wherein said rule addresses said violation using parameterized thresholds involving both noise and timing data.

10. The computer program product as recited in claim 8, wherein said rule addresses said violation involving a path that traverses a hierarchy in said design of said digital integrated circuit.

11. The computer program product as recited in claim 8, wherein said rule is parameterized.

12. The computer program product as recited in claim 8, wherein the program code further comprises the programming instructions for:

training a model to create an appropriate rule for identifying a root cause of a particular violation based on parameters and data that were utilized in rendering a decision of a violation; and creating a rule based on providing said trained model parameters and data of a violation identified from said analysis of said digital integrated circuit.

13. The computer program product as recited in claim 8, wherein said continuous circuit variables comprise noise margins, propagation delay, maximum clock frequencies, steady-state current, and transient signal behavior.

14. The computer program product as recited in claim 8, wherein the program code further comprises the programming instructions for:

implementing said design change based on said recommendation, wherein said recommendation is generated based on a data structure listing design recommendations based on identified root causes or a machine learning model trained to recommend a design change of said digital integrated circuit based on a root cause of a violation.

15. A system, comprising:

a memory for storing a computer program for recommending design changes in designing a digital integrated circuit; and a processor connected to said memory, wherein said processor is configured to execute program instructions of the computer program comprising:

performing an analysis of said digital integrated circuit resulting in a plurality of violations, wherein said analysis comprises performing parametric tests on a design of said digital integrated circuit based on an analysis of a continuous circuit parameter, wherein said parametric tests comprise analyzing continuous circuit variables;

storing said plurality of violations, wherein said stored violations comprise metadata which includes parameters that were utilized to determine that a violation had occurred;

analyzing one of said stored violations to identify a root cause of said one of said stored violations involving a cross-domain, a cross-hierarchy and a multi-cycle violation using a rule, wherein said rule is targeted for triaging said cross-domain, said cross-hierarchy and said multi-cycle violation that was identified based on said analysis of said digital integrated circuit; and generating a recommendation of a design change in designing said digital integrated circuit for said one of said stored violations based on said identified root cause.

16. The system as recited in claim 15, wherein said rule addresses said violation using parameterized thresholds involving both noise and timing data.

17. The system as recited in claim 15, wherein said rule addresses said violation involving a path that traverses a hierarchy in said design of said digital integrated circuit.

18. The system as recited in claim 15, wherein said rule is parameterized.

19. The system as recited in claim 15, wherein the program instructions of the computer program further comprise:

training a model to create an appropriate rule for identifying a root cause of a particular violation based on parameters and data that were utilized in rendering a decision of a violation; and creating a rule based on providing said trained model parameters and data of a violation identified from said analysis of said digital integrated circuit.

20. The system as recited in claim 15, wherein said continuous circuit variables comprise noise margins, propagation delay, maximum clock frequencies, steady-state current, and transient signal behavior.

\* \* \* \* \*